Patented July 3, 1951

2,558,812

UNITED STATES PATENT OFFICE 2,558,812

RESIN AND PROCESS FOR ITS MANUFACTURE BY CONDENSATION OF A PHENOL, AN ALKYL AROMATIC HYDROCARBON, AND A POLYENIC HYDROCARBON

Herman S. Bloch, Chicago, Ill., assignor to Universal Oil Products Company, Chicago, Ill., a corporation of Delaware No Drawing. Application October 24, 1947,
Serial No. 782,022

9 Claims. (Cl. 260—62)

This application is a continuation-in-part of my copending application Serial No. 534,155, filed May 4, 1944, and now abandoned.

This invention relates to the preparation of resins by reacting an aromatic hydrocarbon and a phenolic compound with a polyenic hydrocarbon and preferably with a conjugated diolefinic hydrocarbon.

More particularly, the present invention is concerned with the manufacture of resinous material suitable for use in coating compositions by the catalytic reaction of an aromatic hydrocarbon, a phenol, and a polyenic hydrocarbon.

An object of this invention is to prepare a resin with high solubility in oxygen-containing organic solvents such as ethers and esters.

Another object of this invention is to form a resin with high softening point, good strength, and hardness, and having improved adhesion to surfaces of wood and metals.

One specific embodiment of this invention relates to a process for producing a synthetic resin which comprises reacting in the presence of a strong mineral acid catalyst a polyenic hydrocarbon, a phenol having at least two substitutable nuclear hydrogen atoms, and an aromatic hydrocarbon having at least two replaceable nuclear hydrogen atoms and alkyl groups of not more than two carbon atoms.

Another embodiment of this invention relates to a process for producing a synthetic resin which comprises reacting in the presence of a strong mineral acid catalyst a polyenic hydrocarbon, a phenol having at least two substitutable nuclear hydrogen atoms, and an alkyl aromatic having at least two replaceable nuclear hydrogen atoms and in which said alkyl group contains not more than two carbon atoms, separating resinous reaction product, unconverted reactants and catalyst from the resultant reaction mixture, and recovering said resinous reaction product.

A further embodiment of this invention relates to a process for manufacturing a resin which comprises reacting in the presence of a strong mineral acid catalyst a major molecular proportion of a polyenic hydrocarbon and minor molecular proportions of a phenol having at least two nuclear hydrogen atoms and an alkyl aromatic hydrocarbon having at least two nuclear hydrogen atoms and an alkyl group of not more than two carbon atoms, stopping the reaction by treating the reaction mixture with a member of the group consisting of water and an aqueous alkaline solution, and separating the resulting resinous product from unconverted organic materials and aqueous solution.

The incorporation of a phenolic material in the resins of my invention, results in an improvement over the analogous hydrocarbon resins with respect to solubility in oxygenated solvents, such as esters and ethers, as well as an increase in softening point, hardness, and strength of the finished resins. When employed in coating compositions the phenol-containing resins show improved adhesion to metals and woods and are of generally more satisfactory durability than the purely hydrocarbon resins.

Broadly, my invention comprises preparing a resinous material having improved adhesive and coating qualities by reacting an aromatic hydrocarbon and a phenolic material with a polyene in the presence of an acidic catalyst.

The polyenic hydrocarbons preferred as starting materials in this process have two conjugated double bonds per molecule and include butadiene-1,3; isoprene; piperylene; cyclopentadiene; cyclohexadiene and other cyclic hydrocarbons having at least two double bonds per molecule. Such cyclic hydrocarbons include polycyclic unsaturated hydrocarbons having conjugated and also non-conjugated unsaturation and formed under the influence of strong acidic catalysts as sulfuric acid, hydrogen fluoride, etc. from aliphatic hydrocarbons and particularly from olefins.

The alkyl aromatic hydrocarbons used in this process should have at least two nuclear hydrogen atoms which may be replaced by reaction with polyolefins and phenols. These alkyl aromatic hydrocarbons include toluene, ethylbenzene, and other alkyl aromatic hydrocarbons having alkyl groups of not more than two carbon atoms. Alkylated naphthalene and other alkylated polycyclic hydrocarbons are also useful in the process but benzene, naphthalene and other polynuclear aromatics free from alkyl substituents generally yield resins which have low solubility in most organic solvents and accordingly, are less desirable in this process. Pure alkyl aromatic hydrocarbons may be used or a fraction containing alkyl aromatic hydrocarbons and substantially saturated hydrocarbons may be employed. Such hydrocarbon fractions containing alkyl aromatic hydrocarbons may boil in the range of gasoline, kerosene, or even heavier fractions.

The phenolic reactants of this process which include phenol, mono-alkylphenols, polyalkylphenols, cyclo-alkylphenols, arylphenols, and polynuclearphenols such as naphthols and tetrahydronaphthols have at least two and better 3 or 4 hydrogen atoms combined with carbon atoms of the phenolic ring in order to produce a high melting resin. A phenol having 3 or 4 readily replaceable nuclear hydrogen atoms is not only able to react with diolefinic and aromatic hydrocarbons to form long chain resin molecules, but this resin may be reacted further with formaldehyde as hereinafter set forth.

The aromatic hydrocarbon fraction charge to the process should contain at least 10% of usable alkyl aromatic hydrocarbons and should be substantially free from non-alkylated aromatics. The lower limit of the proportion of phenols charged should be at least about 10 mole per cent of the total of alkyl aromatic hydrocarbons and phenols. This lower limit of phenol proportion is essential so that the finished resin (which may vary in molecular weight from about 500 to about 1500) may have incorporated therein an average of at least one phenolic nucleus per molecule. The total amount of phenolic material present in the reaction mixture should be not more than about 50 mole per cent of the total of the alkyl aromatic hydrocarbons plus phenols contained in the mixture. In forming the resin of this process, the preferred molecular ratio of polyene to the total of alkyl aromatic hydrocarbons plus phenols is generally about one if dienes are used or this ratio is less than one if the polyenes are more unsaturated than the dienes. If a hard-finish resin is desired, a little more than a mole, i. e., about 1.5 moles per mole of aromatic are used. If, however, it is desired to produce a soft resinoid which is to be further reacted, as for example, with formaldehyde, the mole to mole ratio is preferred. By reacting the resinoid with formaldehyde or other aldehydes or ketones, harder thermo-setting resins may be prepared. Suitable aldehydes and ketones include acetaldehyde, propionaldehyde, acetone, butyraldehyde, crotonaldehyde, benzaldehyde, cinnamaldehyde etc.

In this process the reactants are charged in the proportions of from about 5 to about 25 mole per cent of phenols, from about 25 to about 45 mole per cent alkyl aromatic hydrocarbons and from about 50 to about 60 mole per cent of polyenes, the latter preferably conjugated alkadienes. Accordingly, a typical reaction mixture contains from 10 to 50 molecular proportions of a phenol or phenol mixture, from 90 to 50 molecular proportions of xylenes, ethylbenzene or other suitable aromatic hydrocarbon or aromatic hydrocarbon mixture, and from 100 to 150 molecular proportions of polyenic hydrocarbon such as butadiene-1,3. If less dienic or other polyenic hydrocarbon is present in the reaction mixture than that needed to react with the aromatic hydrocarbons as well as the phenols the resultant resin will contain substantial amounts of a phenol-polyene condensation product which may be liquid. When the specified proportions of the three reactants are present, such better yields of a hard resin are formed by the interaction of all three of these resin components, namely phenol, alkyl aromatic hydrocarbon and polyene. It appears that the phenols react more rapidly than the alkyl aromatics with the polyenic hydrocarbons and accordingly the use of a higher molecular proportion of polyene than phenol promotes formation of the three-component resin of this process.

Catalysts suitable for use in this process comprise the strong mineral acids sulfuric acid, phosphoric acid, and hydrofluoric acid. These different catalysts are not necessarily employed in the same conditions of operation nor are equivalent results obtained in their presence. The sulfuric acid catalyst contains at least 90% by weight of $H_2SO_4$, the remainder being water, but the catalyst should contain 95% or more of $H_2SO_4$ in order to promote greater reaction efficiency. Hydrogen fluoride catalyst which is also referred to as hydrofluoric acid should also contain at least 90% by weight of HF and preferably more than 95% by weight of HF. Phosphoric acids containing about 90% by weight of $H_3PO_4$ may also be used, but a higher yield of resin is obtained when employing a phosphoric acid catalyst of higher concentration.

In carrying out the process of this invention, the mixture of phenol and the aromatic hydrocarbons or the hydrocarbon fraction containing aromatics is commingled with a stoichiometric equivalent or excess of polyenic hydrocarbon and heated in the presence of the catalyst at a temperature usually below about 150° C. but generally in the range of 0° to 50° C. The reaction mixture is then treated with water or an aqueous solution of an alkali for the purpose of inactivating the catalyst, stopping the reaction, and decomposing the complexes of catalyst with organic material. When using sulfuric acid catalyst, a refluxing treatment of the organic-aqueous two phase system decomposes the emulsifying sulfonic acids and assists in the separation of the resinous product from the uncondensed organic material and the aqueous phase. The last step can be done by steam-distilling the two phase system and subsequently separating the resinous residue from the aqueous phase, or by first separating the aqueous phase and then vacuum-distilling or steam-distilling the organic phase; the exact order or manner of procedure is generally unimportant. After the unreacted material and water are removed from the plastic residue as by heating at 90° to 200° C. and the plastic residue is permitted to cool, it sets quickly to form a clear, pale resin having good solubilities in aromatic hydrocarbons, chlorinated hydrocarbons, and higher members of the series of lacquer solvents of the ester, ketone, glycol-ester, and glycol-ether types.

The separation of olefin polymers and unreacted material such as excess polyene, phenol or non-aromatic hydrocarbons (in cases wherein naphtha fractions are employed instead of pure hydrocarbons) is preferably effected by steam distillation rather than by ordinary distillation unless the latter is carried out at subatmospheric pressure. Distillation at atmospheric pressure causes darkening of the resinous product.

When anhydrous hydrogen fluoride is employed as the catalyst for the reaction, the reaction products may be decomposed by heat and the substantially anhydrous hydrogen fluoride recovered for further use. The remaining material is treated as before to remove unreacted components and olefin polymers and the plastic residue freed from water to yield the desired resin.

In an alternative method of procedure, the phenol is added to the reaction mixture after partial condensation has been effected between the aromatic hydrocarbon and the polyenic material. Less catalyst is needed when following this method of operation but greater care is required to insure a homogeneous product having satisfactory properties.

The composition and properties of the resin prepared according to the method hereinabove set forth may be varied if, instead of or together with the phenol, other substituted aromatic compounds are employed. These compounds include aromatic amines or simple derivatives thereof, aromatic carboxylic acids or their simple derivatives, aromatic alcohols or derivatives thereof, aromatic aldehydes or their acetals, aromatic nitro or nitroso compounds or aromatic sulfonic acids or their simple derivatives.

The following examples are introduced to illustrate the process of this invention but are not to be considered as unduly limiting the broad scope of the invention.

*Example I*

159.1 grams of xylenes and 47.05 grams of phenol were combined and introduced to a reactor equipped with a stirring device. The reactor was chilled and 102 grams of 96% sulfuric acid was added. 120 grams of butadiene was introduced slowly to the reaction mixture which was maintained at a temperature of 5° to 10° C. for six hours. Water was then added to the reaction mixture which was then heated under reflux for one hour (during which sulfonic acids were decomposed), and the entire mixture was then steam-distilled to remove any unreacted xylenes and phenol. The steam-distillate was a water-white aromatic liquid containing 82% of xylenes. The residue from the steam-distillation after being freed from water by vacuum-distillation was a resinous solid with a softening point (ball and ring) of 131° F. The resinous solids so obtained weighed 225.5 grams.

*Example II*

A mixture of 159.1 grams of xylenes, 47.05 of phenol, and 120 grams of butadiene was reacted in the presence of 93 grams of phosphoric acid (90% $H_3PO_4$ and 10% water). At temperatures up to 50° C., reaction was comparatively slow and yields were quite small, but at higher temperatures the reaction occurs more readily and better yields are obtained. The products of reaction were treated as in Example I to recover a resinous product similar to that formed when sulfuric acid was used as the catalyst.

*Example III*

In this run, 201 grams of hydrogen fluoride was used as the catalyst for the reaction of a mixture of 212 grams xylenes, 63 grams phenol and 149 grams of butadiene; the latter was added gradually over a period of several hours. The reaction was conducted at a temperature ranging from about 7 to about 13° C., and the products of the reaction were treated as hereinbefore set forth to yield a resinous material having properties similar to those of the resins formed in Examples I and II.

I claim as my invention:

1. A process for producing a synthetic resin which comprises reacting from about 5 to about 25 mole per cent of a phenol having at least two nuclear hydrogen atoms, from about 25 to about 45 mole per cent of an aromatic hydrocarbon having at least two nuclear hydrogen atoms and an alkyl group of not more than two carbon atoms, and from about 50 to about 60 mole per cent of a conjugated aliphatic diene hydrocarbon in the presence of an acidic catalyst containing at least 90% by weight of mineral acid selected from the group consisting of hydrogen fluoride, phosphoric acid, and sulfuric acid.

2. A process for producing a synthetic resin which comprises reacting at a temperature of from about 0° to about 150° C. from about 5 to about 25 mole per cent of a phenol having at least two nuclear hydrogen atoms, from about 25 to about 45 mole per cent of an aromatic hydrocarbon having at least two nuclear hydrogen atoms and an alkyl group of not more than two carbon atoms, and from about 50 to about 60 mole per cent of a conjugated aliphatic diene hydrocarbon in the presence of an acidic catalyst containing at least 90% by weight of mineral acid selected from the group consisting of hydrogen fluoride, phosphoric acid, and sulfuric acid.

3. A process for producing a synthetic resin which comprises reacting from about 5 to about 25 mole per cent of a phenol having at least two nuclear hydrogen atoms, from about 25 to about 45 mole per cent of an aromatic hydrocarbon having at least two nuclear hydrogen atoms and an alkyl group of not more than two carbon atoms, and from about 50 to about 60 mole per cent of a conjugated aliphatic diene hydrocarbon in the presence of an acidic catalyst comprising at least 90% by weight of hydrogen fluoride.

4. A process for producing a synthetic resin which comprises reacting from about 5 to about 25 mole per cent of a phenol having at least two nuclear hydrogen atoms, from about 25 to about 45 mole per cent of an aromatic hydrocarbon having at least two nuclear hydrogen atoms and an alkyl group of not more than two carbon atoms, and from about 50 to about 60 mole per cent of a conjugated aliphatic diene hydrocarbon in the presence of an acidic catalyst comprising at least 90% by weight of phosphoric acid.

5. A process for producing a synthetic resin which comprises reacting from about 5 to about 25 mole per cent of a phenol having at least two nuclear hydrogen atoms, from about 25 to about 45 mole per cent of an aromatic hydrocarbon having at least two nuclear hydrogen atoms and an alkyl group of not more than two carbon atoms, and from about 50 to about 60 mole per cent of a conjugated aliphatic diene hydrocarbon in the presence of an acidic catalyst comprising at least 90% by weight of sulfuric acid.

6. A process for producing a synthetic resin which comprises reacting from about 5 to about 25 mole per cent of a phenol having at least two nuclear hydrogen atoms, from about 25 to about 45 mole per cent of an aromatic hydrocarbon having at least two nuclear hydrogen atoms and an alkyl group of not more than two carbon atoms, and from about 50 to about 60 mole per cent of a conjugated aliphatic diene hydrocarbon in the presence of an acidic catalyst comprising at least 90% by weight of hydrogen fluoride at a temperature of from about 0° to about 50° C.

7. A process for producing a synthetic resin which comprises reacting from about 5 to about 25 mole per cent of a phenol having at least two nuclear hydrogen atoms, from about 25 to about 45 mole per cent of an aromatic hydrocarbon having at least two nuclear hydrogen atoms and an alkyl group of not more than two carbon atoms, and from about 50 to about 60 mole per cent of a conjugated aliphatic diene hydrocarbon in the presence of an acidic catalyst comprising at least 90% by weight of sulfuric acid at a temperature of from about 0° to about 50° C.

8. A process for producing a synthetic resin which comprises reacting from about 5 to about 25 mole per cent of phenol, from about 25 to about 45 mole per cent of xylene, and from about 50 to about 60 mole per cent of butadiene-1,3 at a temperature of from about 0° to about 150° C. in the presence of an acidic catalyst containing at least 90% by weight of mineral acid selected from the group consisting of hydrogen fluoride, phosphoric acid, and sufuric acid.

9. A resin formed by the process defined in claim 2.

HERMAN S. BLOCH.

REFERENCES CITED

The following references are of record in the file of this patent:

UNITED STATES PATENTS

| Number | Name | Date |
|---|---|---|
| 1,469,709 | Wuyts | Oct. 2, 1923 |
| 2,123,898 | Honel et al. | July 19, 1938 |
| 2,154,192 | Zinke | Apr. 11, 1939 |
| 2,343,845 | Powers | Mar. 7, 1944 |
| 2,353,282 | Turkington et al. | July 11, 1944 |
| 2,378,436 | Rummelsburg | June 19, 1945 |
| 2,471,453 | Rummelsburg | May 31, 1949 |

FOREIGN PATENTS

| Number | Country | Date |
|---|---|---|
| 516,936 | Great Britain | Jan. 16, 1940 |